US012632746B2

(12) United States Patent
Russo

(10) Patent No.: US 12,632,746 B2
(45) Date of Patent: May 19, 2026

(54) METHOD AND APPARATUS FOR DISPLAYING CATEGORIZED CARBON EMISSIONS

(71) Applicant: PITT-OHIO, Pittsburgh, PA (US)

(72) Inventor: Justine A. Russo, Pittsburgh, PA (US)

(73) Assignee: Pitt-Ohio, Pittsburgh, PA (US)

( * ) Notice: Subject to any disclaimer, the term of this patent is extended or adjusted under 35 U.S.C. 154(b) by 15 days.

(21) Appl. No.: 17/981,796

(22) Filed: Nov. 7, 2022

(65) Prior Publication Data

US 2024/0160956 A1 May 16, 2024

(51) Int. Cl.
*G06N 5/022* (2023.01)
(52) U.S. Cl.
CPC .................................... *G06N 5/022* (2013.01)
(58) Field of Classification Search
CPC ...................................................... G06N 5/022
See application file for complete search history.

(56) References Cited

U.S. PATENT DOCUMENTS

| | | | |
|---|---|---|---|
| 8,306,837 B2 | 11/2012 | Eager | |
| 9,751,407 B2 | 9/2017 | Gerhardt | |
| 2012/0172017 A1* | 7/2012 | Ratti | H04W 52/0254 |
| | | | 455/414.1 |
| 2012/0173293 A1 | 7/2012 | Motley | |
| 2017/0103325 A1* | 4/2017 | Meinrenken | G06Q 10/00 |
| 2018/0012233 A1 | 1/2018 | Steigler | |
| 2020/0200649 A1 | 6/2020 | Ammoura | |

| | | | |
|---|---|---|---|
| 2020/0372588 A1* | 11/2020 | Shi | G06Q 50/06 |
| 2022/0188856 A1* | 6/2022 | Leung | B60W 50/14 |
| 2022/0230251 A1* | 7/2022 | Kawamori | G06N 20/00 |
| 2022/0327538 A1* | 10/2022 | Kumar | H04L 9/3263 |

OTHER PUBLICATIONS

Xu, et al. "Identification of on-road vehicle CO2 emission pattern in China: A study based on a high-resolution emission inventory", Resources, Conservation and Recycling: vol. 175. Dec. 2021 (Year: 2021).*
Rolnick et. al. "Tackling Climate Change with Machine Learning", ACM Computing Surveys: vol. 55, Issue 2, Feb. 7, 2022 (Year: 2022).*

* cited by examiner

*Primary Examiner* — Nhat Huy T Nguyen
*Assistant Examiner* — Sally T. Ley
(74) *Attorney, Agent, or Firm* — Caldwell LLC

(57) ABSTRACT

An apparatus and method for displaying categorized carbon emissions is disclosed. The apparatus may include at least a processor, and a memory communicatively connected to the at least a processor. The memory contains instructions configuring the at least a processor to receive carbon emissions data, categorize the carbon emissions data into a category of a plurality of categories, wherein the plurality of categories comprises at least an indirect emissions category and at least a direct emissions category. The memory further contains instructions configuring the at least a processor to display presentation content comprising the categorized carbon emissions data, wherein the categorized carbon emissions data is displayed according to the at least an indirect emissions category and the at least a direct emissions category.

18 Claims, 7 Drawing Sheets

200

204

208

Menu

Carbon Emission Data

212 ── Categories

• Direct Emission Category
• Indirect Emission Category
• Facility Category
• Fuel-Type Category
• Operator Category

216

220

224

228

Transport Vehicle: _____

Driver's Name: _____

Miles: _____

Categories: _____

METHOD AND APPARATUS FOR DISPLAYING CATEGORIZED CARBON EMISSIONS

FIELD OF THE INVENTION

The present invention generally relates to the field of carbon emissions tracking. In particular, the present invention is directed to displaying categorized carbon emissions.

BACKGROUND

Greenhouse gases causes the greenhouse effect, which results in global warming. Carbon dioxide ($CO_2$) is the primary greenhouse gas. While $CO_2$ emissions come from a variety of natural sources, in 2020, $CO_2$ accounted for about 79% of all U.S. greenhouse gas emissions from human activities. The main human activity that emits $CO_2$ is the combustion of fossil fuels for energy, electricity usage and transportation. Tracking carbon emissions is valuable to reduce greenhouse gas emissions. Existing carbon emissions tracking solutions are not sufficient for the problem.

SUMMARY OF THE DISCLOSURE

In an aspect, an apparatus for displaying categorized carbon emissions, the apparatus including at least a processor and a memory communicatively connected to the at least a processor, the memory containing instructions configuring the at least a processor to receive carbon emissions data. The memory containing instructions further configuring the at least a processor to categorize the carbon emissions data into a category of a plurality of categories, wherein the plurality of categories comprises at least an indirect emissions category and at least a direct emissions category. The memory containing instructions further configuring the at least a processor to display presentation content comprising the categorized carbon emissions data, wherein the categorized carbon emissions data is displayed according to the at least an indirect emissions category and the at least a direct emissions category.

In another aspect, a method for displaying categorized carbon emissions, the method including receiving, using at least a processor, carbon emissions data. The method further including categorizing, using the at least a processor, the carbon emissions data into a category of a plurality of categories, wherein the plurality of categories comprises at least an indirect emissions category and at least a direct emissions category. The method further including displaying, using the at least a processor, presentation content comprising the categorized carbon emissions data, wherein the categorized carbon emissions data is displayed according to the at least an indirect emissions category and the at least a direct emissions category.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. however, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for tracking carbon emissions. In an embodiment, carbon emissions data may be calculated from operation data. In an embodiment, operation data may include transport data.

Aspects of the present disclosure can be used to categorize the carbon emissions data using a machine-learning model.

Aspects of the present disclosure allow for displaying the categorized carbon emissions data using a network. Exemplary embodiments illustrating aspects of the present disclosure are described below in the context of several specific examples.

Figure 1:
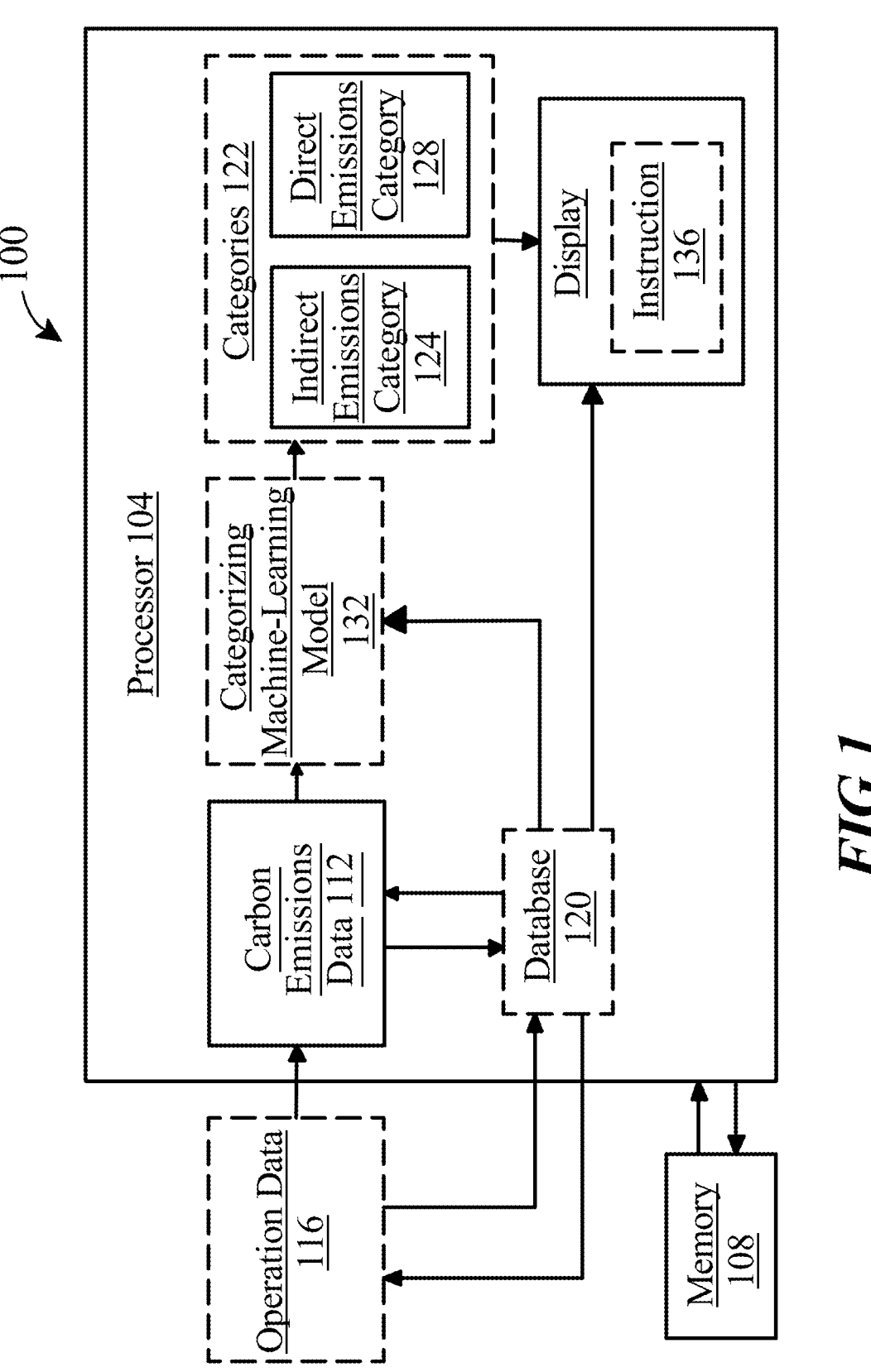
FIG. 1 is a block diagram of an exemplary embodiment of an apparatus for displaying categorized carbon emissions.

Referring now to FIG. 1, an exemplary embodiment of an apparatus 100 displaying the categorized carbon emissions is illustrated. System includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

Still referring to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 contains a memory 108 communicatively connected to the at least a processor 104. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, the memory 108 contains instructions configuring the processor 104 to receive carbon emissions data 112. "Carbon emissions data," for the purposes of this disclosure, is data relating to the emissions of carbon dioxide. A "greenhouse gas," for the purposes of this disclosure, is a gas that absorbs and emits radiant energy within the thermal infrared range, causing the greenhouse effect. The primary greenhouse gases in Earth's atmosphere are water vapor ($H_2O$), carbon dioxide ($CO_2$), methane ($CH_4$), nitrous oxide ($N_2O$), and ozone ($O_3$). A "greenhouse effect," for the purposes of this disclosure, is a process that occurs when energy from a planet's host star goes through its atmosphere and warms the planet's surface, but the atmosphere prevents the heat from returning directly to space, resulting in a warmer planet. In an embodiment, the carbon emissions data may be calculated from greenhouse gas data. A "greenhouse gas data," for the purposes of this disclosure, is a metric associated with a pollutant that contributes to the greenhouse effect. A "pollutant," for the purposes of this disclosure, is a substance that degrades environmental quality. In some embodiments, the greenhouse gas data may include, but is not limited to, carbon emissions, water vapor, methane, nitrous oxide, ozone, chlorofluorocarbons, hydrofluorocarbons, perfluorocarbons, and the like. The greenhouse gas data may include measurements associated with an amount of the greenhouse gas generated. In some embodiments, the amount of the greenhouse gas generated may be represented in, but is not limited to, metric tons, pounds, kilograms, cubic meters, and the like. As a nonlimiting example, the greenhouse gas data may include data showing 4 metric tons of carbon have been generated by a user. In some embodiments, the greenhouse gas data may include data from one or more pollutant sources. A "pollutant source," for the purposes of this disclosure, is any originating source of a pollutant. In an embodiment, the pollutant source may include, but is not limited to, transport vehicles, transport vehicle emissions, emissions from processes performed by or products manufactured by a transport vehicle, and the like. A "transport vehicle," for the purposes of this disclosure is a machine capable of moving one or more objects between one or more locations. In some embodiments, the transport vehicle may include, but is not limited to, a freight carrier, a truck, a car, a boat, a plane, a motorcycle, and the like. In an embodiment, the transport vehicle may be configured to operate through, but is not limited to, air, land, sea, and the like. In some embodiments, the transport vehicle may be configured to engage in one or more steps of a transport. In another embodiments, a transport vehicle may engage in pickup, delivery, and/or line haul operations. In another embodiment, the transport vehicle may include, but is not limited to, Less than Truckload ("LTL") and/or Full Truckload ("FTL") freight delivery. In another embodiment, the pollutant source may include, but is not limited to, combustion from boilers. "Boiler", for the purposes of this disclosure, is where thermal energy of fuel is converted to potential energy in a form of steam for later use by a steam engine. In another embodiment, the pollutant source may include, but is not limited to, furnaces, "Furnace", for the purposes of this disclosure, is a source for natural gas heating built inside a vehicle HVAC system. Greenhouse gas data may be consistent with any greenhouse gas data disclosed in U.S. patent application Ser. No. 17/749, 535, filed on May 20, 2022, and entitled "SYSTEM AND METHOD FOR GREENHOUSE GAS TRACKING," the entirety of which is incorporated by reference herein in its entirety.

Still referring to FIG. 1, in some embodiments, the carbon emissions data 112 may include transportation carbon footprint. "Carbon footprint," for the purposes of the disclosure, is a total greenhouse gas emissions caused by an individual, event, organization, service, place or product. "Transportation carbon footprint," for the purposes of this disclosure, is an indicator that measures greenhouse gas emissions caused by actions related to transportation. "Transportation," for the purposes of disclosure, is movement of goods, services, and/or equipment by a transport vehicle. The movement of goods may occur via ground, water, air transport, or any combination thereof. As a non-limiting example, the transportation may include transporting full truckload freights from Beijing, China to Massachusetts, the United States. In an embodiment, the transportation carbon footprint may include fuel usage of a transport vehicle. "Fuel," for the purposes of this disclosure, is a material used to produce heat or power by burning. The fuel may include, but is not limited to, gasoline, diesel, propane, liquefied natural gas, and/or other fuel types. In some embodiments, a transport vehicle may use alternative fuel. An "alternative fuel" as used in this disclosure is any energy source generated without a use of fossils. A "fossil" as used in this disclosure is preserved remains of any once-living organism. Alternative fuels may include, but are not limited to, nuclear power, compressed air, hydrogen power, biofuel, vegetable oil, propane, and the like. In the instance of alternative fuel, an energy conversion factor may be included. In some embodiments, an energy conversion factor may include, but is not limited to, gallons to electric equivalent for a hybrid or electric transport vehicle. The fuel usage of a transport vehicle, in some embodiments, may include the amount of fuel used over a period of time during a transportation. In some embodiments, the period of time may be the period of time it took to complete a particular transportation. As a non-limiting example, if a transportation took 5 hours to complete, the period of time may correspond to those 5 hours. The fuel usage of a transport vehicle, as a non-limiting example, may include 4 gallons of fuel for 5 hours driving a transporting truck.

Still referring to FIG. 1, in some embodiments, the carbon emissions data 112 may include packaging carbon footprint. "Packaging carbon footprint," for the purposes of this disclosure, is an indicator that measures greenhouse gas emissions caused by actions related to packaging. In an embodiment, the packaging carbon footprint may include carbon emissions from management of waste derived from packaging. In another embodiment, the packaging carbon footprint may include carbon emissions from packaging process. In some embodiments, the packaging carbon footprint may include carbon emissions from a type of materials in packaging. The materials in packaging, as a non-limiting example, may include plastic, paper, cardboard, and the like. As a non-limiting example, the packaging carbon footprint may include 3.5 kg of carbon dioxide emitted to for a kilogram of plastic. In some embodiments, the packaging carbon footprint may include carbon emissions from loading packaged products into a transport vehicle. As a non-limiting example, the packaging carbon footprint may include carbon emissions from electricity used in a warehouse for packaged products storage.

Still referring to FIG. 1, in some embodiments, the carbon emissions data 112 may include manufacturing carbon footprint. "Manufacturing carbon footprint," for the purposes of this disclosure, is an indicator that measures greenhouse gas emissions caused by actions related to manufacturing. In an embodiment, the manufacturing carbon footprint may include carbon emissions associated with carbon emissions site. A "carbon emissions site," for the purposes of this disclosure, is a building or infrastructure that emits carbon dioxide. As a non-limiting example, the carbon emissions site may include manufacturing plant, warehouse, transportation infrastructure, and the like. In an embodiment, the manufacturing carbon footprint may include carbon emissions produced by manufacturing a product. A "product," for the purposes of this disclosure, is a substance that is manufactured for sale. As a non-limiting example, the product may include cars, furniture, computers, food, beverages, and the like. The manufacturing carbon footprint, as a non-limiting example, may include electricity usage of a manufacturing plant. The manufacturing carbon footprint, in another embodiment, may include warehouse equipment usage. "Warehouse equipment" is a machinery moving one or more materials around a warehouse. As non-limiting examples, warehouse equipment may include order picker forklifts, reach trucks, automated storage and retrieval machine, and the like.

Still referring to FIG. 1, carbon emissions data 112 may be calculated as a function of the amount of fuel that is consumed. In a non-limiting example, one liter of gasoline, when used as a fuel, produces 2.32 kg (about 1300 liters or 1.3 cubic meters) of carbon dioxide, a greenhouse gas. One US gallon produces 19.4 lb. (1,291.5 gallons or 172.65 cubic feet). Carbon emissions data 112 also be generated as a function of energy generated from the fuel. In a non-limiting example, the mass of carbon dioxide that is released when one MJ of energy is released from fuel can be estimated to a good approximation. For the chemical formula of diesel, we use as an approximation $C_nH_{2n}$. Note that diesel is a mixture of different molecules. As carbon has a molar mass of 12 g/mol and hydrogen has a molar mass of about 1 g/mol, so the fraction by weight of carbon in diesel is roughly 12/14. The reaction of diesel combustion is given by:

$$2C_nH_{2n}+3nO_2 \rightleftharpoons 2nCO_2+2nH_2O$$

Carbon dioxide has a molar mass of 44 g/mol as it consists of 2 atoms of oxygen (16 g/mol) and 1 atom of carbon (12 g/mol). So, 12 g of carbon yield 44 g of Carbon dioxide. Diesel has an energy content of 42.6 MJ per kg, or 23.47 gram of Diesel contain 1 MJ of energy. Putting everything together the mass of carbon dioxide that is produced by releasing 1 MJ of energy from diesel fuel can be calculated as:

$$23.47 \text{ g}\frac{\text{Diesel}}{\text{MJ}} * \frac{12}{14} * \frac{44}{12} = 74 \text{ g (Carbon Dioxide)/MJ}$$

For gasoline, with 22 g/MJ and a ratio of carbon to hydrogen atoms of about 6 to 14, the estimated value of carbon emissions for 1 MJ of energy is:

$$22 \text{ g} \frac{\text{gasoline}}{\text{MJ}} * \frac{6*12}{6*12+14*1} * \frac{44}{12} = 67.5 \text{ g (Carbon Dioxide)/MJ}$$

Carbon emissions data 112 may be calculated using any method for calculating carbon emissions data disclosed in patent application Ser. No. 17/945,683, filed on Sep. 15, 2022, and entitled "AN APPARATUS FOR IDENTIFYING AN EXCESSIVE CARBON EMISSION VALUE AND A METHOD FOR ITS USE," the entirety of which is incorporated by reference herein in its entirety.

| | Mass of carbon dioxide emitted per quantity of energy for various fuels | | |
|---|---|---|---|
| Fuel name | $CO_2$ emitted (lbs./$10^6$ Btu) | $CO_2$ emitted (g/MJ) | $CO_2$ emitted (g/kWh) |
| Natural gas | 117 | 50.30 | 181.08 |
| Liquefied petroleum gas | 139 | 59.76 | 215.14 |
| Propane | 139 | 59.76 | 215.14 |
| Aviation gasoline | 153 | 65.78 | 236.81 |
| Automobile gasoline | 156 | 67.07 | 241.45 |
| Kerosene | 159 | 68.36 | 246.10 |
| Fuel oil | 161 | 69.22 | 249.19 |
| Tires/tire derived fuel | 189 | 81.26 | 292.54 |
| Wood and wood waste | 195 | 83.83 | 301.79 |
| Coal (bituminous) | 205 | 88.13 | 317.27 |
| Coal (sub-bituminous) | 213 | 91.57 | 329.65 |
| Coal (lignite) | 215 | 92.43 | 332.75 |
| Petroleum coke | 225 | 96.73 | 348.23 |
| Coal (anthracite) | 227 | 97.59 | 351.32 |

Still referring to FIG. 1, in some embodiments, the carbon emissions data 112 may be detected by a sensor or sensors. A "sensor," for the purposes of this disclosure, is a device that is configured to detect an input and/or a phenomenon and transmit information related to the detection. In some embodiments, sensors may be communicatively connected to the processor 104. In some embodiments, a sensor may transduce a detected phenomenon and/or characteristic, such as without limitation, temperature, voltage, pressure, and the like, into a sensed signal. Sensors may include one or more sensors which may be the same, similar, or different. In some embodiments, the sensor may include a plurality of sensors. The sensor may be a contact or a non-contact sensor. In some embodiments, the sensor may be an encoder. An "encoder," for the purposes of this disclosure, is a sensing device that converts an angular motion or position into analog or digital output signals. Encoders may convert motion to an electrical signal that can be read by some type of control device in a motion control system, such as a counter or PLC. The encoder may send feedback signal that can be used to determine position, count, speed, direction, and the like. The processor 104 may use this information to send a command for a particular function. The carbon emissions data 112, in some embodiments, may be detected by a nondispersive infrared (NDIR) $CO_2$ sensor. The NDIR $CO_2$ sensor may include an infrared (IR) lamp, an optical filter and a detector. The IF detector may read remaining amount of light from the IR lamp that was not absorbed by $CO_2$ molecules, which absorbs 4.26-micron absorption band, or the optical filter.

Still referring to FIG. 1, in some embodiments, the carbon emissions data 112 may be calculated from operation data 116. "Operation data," for the purposes of this disclosure, is data relating to the use of a transport vehicle by an operator. For the purposes of this disclosure, an "operator" is a person that uses or controls a transport vehicle. As a non-limiting example, an operator may be a truck driver, a boat pilot, a plane pilot, a biker, a courier and the like. In some embodiments, the processor 104 may receive the operation data 116 from database 120. "Database", for the purposes of this disclosure, is an organized collection of data stored and accessed electronically. The database 120 may be implemented, without limitation, as a relational database, a key-value retrieval database such as a NOSQL database, or any other format or structure for use as a database that a person skilled in the art would recognize as suitable upon review of the entirety of this disclosure. The database 120 may alternatively or additionally be implemented using a distributed data storage protocol and/or data structure, such as a distributed hash table or the like. The database 120 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. In an embodiment, the database may receive the operation data 116 from a transport vehicle. The database 120 may receive the operation data 116, as a non-limiting example, such as fuel consumption of a transport helicopter. "Fuel consumption," for the purposes of this disclosure, is amount of fuel of a vehicle consumed in driving a given distance. In another embodiment, the database 120 may receive the operation data 116 from an operator. The database 120 may receive the operation data 116, as a non-limiting example, such as a type of a vehicle. Still referring to FIG. 1, in some embodiments, carbon emissions data 112 may be manually calculated, for example, by a human.

Still referring to FIG. 1, in an embodiment, the operation data 116 may include transportation data. "Transportation data," for the purposes of this disclosure, is data related movement of goods, services, and/or equipment by a transport vehicle. Transportation data may include data relating to a particular transport of goods, services, and/or equipment by a transport vehicle. A "transport", for the purposes of this disclosure, is a movement of one or more objects between two or more locations The transportation data may include moving goods, services, and or equipment from a first location to a second location. The movement of goods may occur via ground, water, air transport, or any combination thereof. Examples of transportation data may the medium of transportation, duration of transportation, distance of transportation, transport routes, fuel usage during transport, and the like. In another embodiment, the operation data 116 may include manufacturing data. "Manufacturing data," for the purposes of this disclosure, is data that is related manufacturing of goods or products. The manufacturing data, as a non-limiting example, may include materials used to make a product, number of materials used to make a product, product assembly techniques, product packaging used, equipment used to produce a product, weights of payload, packing specifications, traffic data, weather data, and the like. In some embodiments, the operation data 116 may include operator data. "Operator data," for the purposes of this disclosure, is data that is related the actions of an operator. An operator, in some embodiments, may include any person who aids in the creation, manufacture, transportation, and/or delivery of goods and services. As a nonlimiting example, the operator may include product manufacturing workers, product transportation work, product testers, and the like. The operator data, as a non-limiting example, may include number of man-hours used create a product, speed at which a product is transported, the efficiency of the operator, and the like. Examples of operation data may be consistent with operation data disclosed in U.S. patent application Ser. No. 17/981,034, filed on Nov. 4, 2022, and entitled "A METHOD AND APPARATUS FOR ALERTING AN OPERATOR OF A CARBON IMPACT," the entirety of which is incorporated by reference herein in its entirety.

Still referring to FIG. 1, in some embodiments, the operation data 116 may be detected by one or more sensors. In some embodiments, the sensor may include a motion sensor. A "motion sensor", for the purposes of this disclosure, refers to a device or component configured to detect physical movement of an object or grouping of objects. For example, and without limitation, motion sensor may detect the movement of vehicle or objects being transported by vehicle, such as, for example, during an unloading or loading process of transport. One of ordinary skill in the art would appreciate, after reviewing the entirety of this disclosure, that motion may include a plurality of types including, but not limited to: spinning, rotating, oscillating, gyrating, jumping, sliding, reciprocating, displacing, or the like. The sensor may include, torque sensor, gyro meter (e.g., gyroscope), accelerometer, magnetometer, inertial measurement unit (IMU), pressure sensor, force sensor, proximity sensor, displacement sensor, vibration sensor, LIDAR sensor, and the like thereof. In a nonlimiting embodiment, the sensor ranges may include a technique for the measuring of distances or slant range from an observer including the sensor to a target which may include a plurality of outside parameters. An "outside parameter," for the purposes of this disclosure, refers to environmental factors or physical vehicle factors that may be further captured by the sensor. Outside parameter may include, but is not limited to, air density, air speed, true airspeed, relative airspeed, current patterns, temperature, humidity level, and weather conditions, among others. Outside parameter may include velocity and/or speed in a plurality of ranges and direction such as vertical speed, horizontal speed, changes in angle or rates of change in angles like pitch rate, roll rate, yaw rate, or a combination thereof, among others. Outside parameter may further include physical factors of the components of vehicle itself, including, but not limited to, remaining fuel or battery. Outside parameter may include at least an environmental parameter. Environmental parameter may be any environmentally based performance parameter as disclosed herein. Environment parameter may include, without limitation, time, pressure, temperature, air density, altitude, gravity, humidity level, speed, debris, among others. Environmental parameters may be stored in any suitable datastore consistent with this disclosure. Technique may include the use of active range finding methods which may include, but not limited to, light detection and ranging (LIDAR), radar, sonar, ultrasonic range finding, and the like. LIDAR systems may include, but are not limited to, a laser, at least a phased array, at least a microelectromechanical machine, at least a scanner and/or optic, a photodetector, GPS, and the like. In a non-limiting embodiment, the sensor including a LIDAR system may targe an object with a laser and measure the time for at least a reflected light to return to the LIDAR system. LIDAR may also be used to make digital 4D representations of areas on the earth's surface and ocean bottom, due to differences in laser return times, and by varying laser wavelengths. In a nonlimiting embodiments, LIDAR system may include a topographic LIDAR and a bathymetric LIDAR, wherein the topographic LIDAR that may use near-infrared laser to map a plot of a land or surface representing a potential checkpoint or travel route of vehicle while the bathymetric LIDAR may use water-penetrating green light to measure seafloor and various water level elevations within and/or surrounding destination or route. Examples of sensors used to detect operation data may be consistent with sensors used to detect operation data disclosed in U.S. patent application Ser. No. 17/981,034, filed on Nov. 4, 2022, and entitled "A METHOD AND APPARATUS FOR ALERTING AN OPERATOR OF A CARBON IMPACT," the entirety of which is incorporated by reference herein in its entirety.

Still referring to FIG. 1, in some embodiments, the operation data 116 may be received manually by an operator. In some embodiments, the operator may use mobile device to send the operation data 116. A "mobile device," for the purposes of this disclosure, is a portable electronic equipment that can connect to the internet. The mobile device, as a non-limiting example, may include smartphones, tablets, laptop computers, and the like. The operator, as a non-limiting example, may put a helicopter for a type of a vehicle as the operation data 116 using a smartphone. As another non-limiting example, the operator may put 8 hours for duration of a transport as the operation data 116 using a tablet. As another non-limiting example, the operator may put plastic for packaging material as the operation data 116 using a laptop computer.

Still referring to FIG. 1, in some embodiments, the processor 104 may receive the carbon emissions data 112 from database 120. In an embodiment, the database 120 may receive the carbon emissions data 112 from a transport vehicle. The database 120 may receive the carbon emissions data 112, as a non-limiting example, such as strength of actuation of a brake as pressure data. In another embodiment, the database 120 may receive the carbon emissions data 112 from an operator. As a non-limiting example, the operator may include long idling time to the database 120 as the carbon emissions data 112.

Still referring to FIG. 1, the memory 108 contains instructions configuring the processor 104 to categorize the carbon emissions data 112 into a category of a plurality of categories 122, wherein the plurality of categories 122 comprises at least an indirect emissions category 124 and at least a direct emissions category 128. The plurality of categories 122, in some embodiments, may include facility category. A "facility category," for the purposes of this disclosure, is a category that contains the carbon emissions data 112 related to a facility. A "facility," for the purposes of this disclosure, is a building, room, or area of a building or room designed to serve a particular function. In some embodiments, the facility category may include sub-categories of different facilities. In an embodiment, the sub-categories may include power plant sub-category. The power plant sub-category, as a non-limiting example, may include electricity usage of a power plant. In another embodiment, the sub-categories may include warehouse sub-category. The warehouse sub-category, as a non-limiting example, may include fuel combustion of a warehouse. In some embodiments, the facility category may be classified into sub-categories of different fuel type used in facilities. In an embodiment, the sub-categories may include electricity category. In another embodiment, the sub-categories may include gasoline category. As a non-limiting example, the gasoline sub-category may include avgas category. "Avgas," for the purposes of this disclosure, is aviation gasoline produced from petroleum.

Still referring to FIG. 1, in some embodiments, the plurality of categories 122 may include driver category. A "operator category," for the purposes of this disclosure, is a category that contains the carbon emissions data 112 related to an operator. In some embodiments, the operator category may include sub-categories of different operator related groups. In an embodiment, the sub-categories may include a driver sub-category. The driver sub-category, as a non-limiting example, may include carbon emissions data 112 collected by each driver of a transport truck.

Still referring to FIG. 1, in some embodiments, the plurality of categories 122 may include fuel-type category. A "fuel-type category," for the purposes of this disclosure, is a category that contains the carbon emissions data 112 related to a type of fuel. In some embodiments, the fuel-type category may include sub-categories of different types of fuel. In an embodiment, the sub-categories may include a biodiesel fuel category. As a non-limiting example, the biodiesel category may include biodiesel consumption data as a function of time. In another embodiment, the sub-categories may include a gasoline fuel category. In some embodiments, the sub-categories may include an electricity sub-category.

Still referring to FIG. 1, in some embodiments, the plurality of categories 122 may include indirect emissions category 124. An "indirect emissions category," for the purposes of this disclosure, is a category corresponding to indirect emissions. "Indirect emissions," for the purposes of this disclosure, are greenhouse gas emissions that are not the direct result of actions by the entity. An "entity," for the purposes of this disclosure, is a person or organization that is in control of, or overseeing, a transport. In an embodiment, the indirect emissions may include carbon emissions through use of purchased electricity. As a non-limiting example, the indirect emissions may include carbon emissions resulted from using electricity that is purchased from a local power utility to power a building. In another embodiment, the indirect emissions may include carbon emissions through use of purchased gasoline. As a non-limiting example, the indirect emissions may include carbon emissions resulted from employee commuting with a transport vehicle, such as a car, a train, a motored bike, and the like. The indirect emissions category 124, in an embodiment, may include sub-categories of different types of indirect emissions. In an embodiment, the sub-categories may include scope 2 emissions category. "Scope 2 emissions category," for the purposes of this disclosure, is a category corresponding to a scope of greenhouse gas emissions measurement measuring indirect emissions emitted by consuming purchased energy. "Purchased energy," for the purposes of the disclosure, is energy purchased to use. The scope 2 emissions category, in an embodiment, may include greenhouse gas emissions released in atmosphere by consuming purchased electricity. As a non-limiting example, the scope 2 emissions category may include greenhouse gas emissions resulted from using electricity that is purchased from a local power utility to power a building. The scope 2 emissions category, in another embodiment, may include greenhouse gas emissions released in atmosphere by consuming purchased heating. The scope 2 emissions category, in some embodiments, may include greenhouse gas emissions released in atmosphere by consuming purchased cooling. As a non-limiting example, the scope 2 emissions category may include greenhouse gas emissions resulted by cooling a leased power facility. In some embodiments, the sub-categories may include scope 3 emissions category. "Scope 3 emissions category," for the purposes of this disclosure, is a category corresponding to a scope of greenhouse gas emissions measurement measuring indirect emissions occurred in a value chain. A "value chain," for the purposes of this disclosure, a progression of activities that a firm operating in a specific industry performs in order to deliver a valuable product to the end customer. The scope 3 emissions category, in an embodiment, may include indirect emissions resulted from end-of-life treatment of products. The scope 3 emissions category, in another embodiment, may include indirect emissions resulted from business travel. The scope 3 emissions category, in another embodiment, may include indirect emissions resulted from employee commuting. The scope 3 emissions category, in some embodiments, may include indirect emissions resulted from waste generated in operations.

Still referring to FIG. 1, in some embodiments, the plurality of categories 122 may include direct emissions category 128. A "direct emissions category," for the purposes of this disclosure, is a category corresponding to direct emissions. "Direct emissions," for the purposes of this disclosure, are greenhouse gas emissions released into atmosphere as a direct result of the actions of an entity. In an embodiment, the direct emissions may include carbon emissions resulted from manufacturing process. As a non-limiting example, the direct emission may include carbon emissions during cement manufacturing. In another embodiment, the direct emissions may include carbon emissions resulted from company owned transport vehicle. As a non-limiting example, the direct emission may include carbon emissions during transporting cements using a company owned transporting truck. The direct emissions category 128, in an embodiment, may include subcategories of different types of direct emissions. In an embodiment, the sub-categories may include scope 1 emissions category. "Scope 1 emissions category," for the purposes of this disclosure, is a category corresponding to a scope of greenhouse gas emissions measurement measuring direct greenhouse gas from sources that are controlled or owned by the entity. The scope 1 emissions category, in an embodiment, may include direct emissions from stationary combustion source. "Stationary combustion source," for the purposes of this disclosure, is a device or a facility that combust solid, liquid, or gaseous fuel, generally for the purposes of producing electricity, generating steam, or providing useful heat or energy for industrial, commercial, or institutional use. The stationary combustion source, as a non-limiting example, may include power plants. A "power plant," for the purposes of this disclosure, is an industrial facility for generation of electric power. The stationary combustion source, as another non-limiting example, may include combined heat and power production plants. A "combined heat and power (CHP) production plant," for the purposes of this disclosure, is an industrial facility for simultaneous and on-site production of electricity and heat. The stationary combustion source, as another non-limiting example, may include industrial combustion plants. A "industrial combustion plant," for the purposes of this disclosure, is an industrial facility for fossil fuel combustion. The stationary combustion source, as another non-limiting example, may include district heating plants. A "district heating plant," for the purposes of this disclosure, is an underground infrastructure asset where thermal energy is provided to multiple buildings from a central energy plant. The scope 1 emissions category, in an embodiment, may include mobile combustion. "Mobile combustion," for the purposes of this disclosure, is a combustion of fuels in company owned or controlled mobile combustion sources. "Company owned mobile combustion sources" or "company controlled mobile combustion sources", as a non-limiting example, may include cars, trucks, buses, trains, airplanes, ships, and the like. The scope 1 emissions category, in another embodiment, may include fugitive emissions. "Fugitive emissions," for the purposes of this disclosure, are unintentional and undesirable emissions, leakage, or discharge of gases or vapors from pressure-containing equipment or facilities, and from components inside an industrial plant. The industrial plant, as a non-limiting example, may include as valves, piping flanges, pumps, storage tanks, compressors, and the like. The fugitive emissions, in an embodiment, may include leaks from gas network. The scope 1 emissions category, in another embodiment, may include process emissions. "Process emissions," for the purposes of this disclosure, are emissions from industrial processes involving chemical or physical transformations other than fuel combustion. The industrial processes, as a non-limiting example, may include cement production, ammonia production, and the like.

Still referring to FIG. 1, the memory 108 contains instructions configuring the processor 104 to categorize the carbon emissions data 112 into a category of a plurality of categories 122 using a categorizing machine-learning model 132. The categorizing machine-learning model 132 may be created using a machine-learning module. The machine-learning module may be consistent with machine-learning module 300 disclosed with reference to FIG. 3. In some embodiments, the categorizing machine-learning model 132 may be generated using training data comprising inputs, such as the carbon emissions data 112 inputs, correlated to outputs, such as the plurality of the categories 122 outputs. As a non-limiting example, the categorizing machine-learning model 132 may receive a plurality of steering wheel data of a transport truck as the inputs. The categorizing machine-learning model 132 may classify each of the plurality of the steering wheel data to a direct emissions category 128. In some embodiments, the categorizing machine-learning model 132 may be trained using training data. As a non-limiting example, the training data may include inputs including the carbon emissions data 112, correlated to the plurality of the category outputs.

In an embodiment, processor 104 may classify carbon emissions data 112 into the direct emissions category 124 depending on originating site of the carbon emissions data 112. "Originating site," for the purposes of this embodiment, is a site where carbon emissions are generated. In some embodiments, processor 104 may classify the carbon emissions data 112 into the direct emissions category 128 when the carbon emissions data 112 was generated from an entity owned facility or equipment. As another non-limiting example, fuel usage of a company-owned-transporting truck may be categorized into the direct emissions category 128. In another embodiment, processor 104 may classify carbon emissions data 112 into the indirect emissions category 124 depending on originating site of the carbon emissions data 112. In some embodiments, processor 104 may classify the carbon emissions data 112 into the indirect emissions category 124 when the carbon emissions data 112 was generated not from an entity produced energy but from other entities purchased the produced energy. As a non-limiting example, electricity usage of a warehouse may be categorized into the indirect emissions category 124.

Still referring to FIG. 1, in some embodiments, the carbon emissions data 112 may be classified manually by an operator. As a non-limiting example, an operator may manually classify the electricity usage of a facility into indirect emissions category 124. As another non-limiting example, an operator may manually classify fuel consumption from a power plant into direct emissions category 128. In some embodiments, the carbon emissions data 112 may exist in multiple categories 122. As a non-limiting example, the carbon emissions from electricity usage of a power plant may be categorized into a facility category and a fuel-type category.

Still referring to FIG. 1, the memory 108 contains instructions configuring the processor 104 to display presentation content comprising the categorized carbon emissions data, wherein the categorized carbon emissions data is displayed according to the at least an indirect emissions category 124 and the at least a direct emissions category 128. "Presentation content," for the purposes of this disclosure, is a content that conveys information to viewers. In some embodiments, the presentation content may be in one or more visual or audio formats. As a non-limiting example, presentation format may include one or more displayable images, graphical representations, animations, videos, audiovisuals, graphs, pie charts, bar charts, trend lines, and the like. In some embodiments, the presentation content may be displayed on multiple windows and/or multiple displays. In some embodiments, the processor 104 may display presentation content on a mobile display device using a network. As a non-limiting example, the mobile display device may include a mobile phone, smartphone, tablet, laptop, desktop computer, vehicle dashboard, and the like. For the purposes of this disclosure, a "network" consists of two or more computing systems that are linked in order to transport and share data. The presentation content, as a non-limiting example, may include a pie chart comparing the sum of carbon emissions from each sub-categories of an indirect emissions category 124. The presentation content, as another non-limiting example, may include trend lines of electricity usage of a power plant from a power plant sub-category. The presentation content, as another non-limiting example, may include animation of carbon emissions through a path of transport route in a real-time. In some embodiments, the presentation content may include single one category. As a non-limiting example, the presentation content may include carbon emissions of different types of fuel, such as gasoline, biodiesel, avgas, and the like, from a fuel-type category. As a non-limiting example, the presentation content sum of carbon emissions of direct emissions category and indirect emissions category. In some embodiments, the presentation content may include multiple categories 122. As a non-limiting example, the presentation content may include a rank of carbon emissions data 112 from plurality of categories 122. As a non-limiting example, sum of carbon emissions data 112 from an electricity category, a gasoline category and an avgas category may be compared and be ranked from the highest to lowest sum of carbon emissions data 112.

Still referring to FIG. 1, in some embodiments, the processor 104 may display presentation content through a graphical user interface (GUI). A "graphical user interface," for the purposes of this disclosure is a set of one or more pictorial icons corresponding to one or more computer actions. GUI, in some embodiments, may receive an instruction 136 relating to the presentation content for the carbon emissions data. An "instruction," for the purposes of this disclosure, is a command that tells the processor 104 to do a task. The instruction, in an embodiment, may include a default instruction. A "default instruction," for the purposes of this disclosure, is a set of instructions which is used unless an operator gives other instructions. The default instruction, in some embodiments, may be changed by an operator. In some embodiments, the instruction 136 may command to display data. As a non-limiting example, the instruction 136 may command to display carbon emissions data 112. As another non-limiting example, the instruction 136 may command to display operation data 116. In some embodiments, the instruction 136 may command to choose a graphical display. As a non-limiting example, the instruction 136 may command to display a pie chart of carbon emissions data 112. As another non-limiting example, the instruction 136 may command to display a map of transport route. The instruction 136 may include a manipulation of computer icons, such as, but not limited to, clicking, selecting, dragging and dropping, scrolling, and the like. The operator, as a non-limiting example, may provide the instruction 136 using a keyboard, mouse, microphone, or the like. In some embodiments, user input may include an entry of characters and/or symbols in a user input field. A "user input field" as used in this disclosure is a portion of graphical user interface configured to receive data from an individual. A user input field may include, but is not limited to, text boxes, search fields, filtering fields, and the like. In some embodiments, user input may include touch input. Touch input may include, but is not limited to, single taps, double taps, triple taps, long presses, swiping gestures, and the like. One of ordinary skill in the art will appreciate the various ways a user may interact with graphical user interface. Examples of graphical user interface may be consistent with graphical user interface disclosed in U.S. patent application Ser. No. 17/749,669, filed on May 20, 2022, and entitled "APPARATUS FOR GENERATING A TRANSPORT REQUEST USING A GRAPHICAL USER INTERFACE," the entirety of which is incorporated by reference herein in its entirety.

Figure 2:
FIG. 2 is an exemplary illustration depicting a display of categorized carbon emissions in accordance with aspects of the invention.

Now referring to FIG. 2, an exemplary illustration of a system 200 for displaying a GUI is shown. System 200 may include display 204. Display 204 may include, but is not limited to, a LCD screen, an OLED screen, and the like. Display 204 may include, but is not limited to, a smartphone, tablet, desktop, laptop, monitor, and the like. Display 204 may display GUI 208. GUI 208 may be, but is not limited to, a touch-interface. "Touch-interface", for the purposes of this disclosure, is a computer-pointing technology based upon the sense of touch. GUI 208 may include, but is not limited to, one or more windows. GUI 208 may be associated with, but is not limited to, a mobile app, website, newsfeed, social media feed, and the like. In some embodiments, GUI 208 may display presentation content. In an embodiment, the presentation content may include data from database. In an embodiment, the data from the database may include operation data. As a non-limiting example, the data from the database may include a type of a transport vehicle. In another embodiment, the database may include carbon emissions data. As a non-limiting example, the data from the database may include transportation carbon footprint. In some embodiments, the presentation content may include categories 212 of categorized carbon emissions data. As a non-limiting example, categories 212 may include a direct emissions category. As another non-limiting example, categories 212 may include an indirect emissions category. As another non-limiting example, categories 212 may include a facility category. In an embodiment, GUI 208 may include one or more charts. In an embodiment, the presentation content may include a bar chart 216. Bar chart 216 may include, but is not limited to, carbon emissions of categorized carbon emissions data. Bar chart 216 may display, as a non-limiting example, carbon emissions of different types of fuel, such as gasoline, biodiesel, avgas, and the like, from a fuel-type category. Bar chart 216 may include, but is not limited to, a comparison of categorized carbon emissions data in different categories from the categories 212. Bar chart 216 may display, as a non-limiting example, comparison of sum of carbon emissions from direct emissions category and indirect emissions category. Bar chart 216 may display, but is not limited to, a rank of carbon emissions data 112 from a category from the categories 212. Bar chart 216 may include, but is not limited to, a rank of carbon emissions data 112 from two or more categories of categories 212. In another embodiment, the presentation content may include a pie chart 220. Pie chart 220 may display, but is not limited to, carbon emissions of categorized carbon emissions data. Pie chart 220 may display, but is not limited to, comparison of categorized carbon emissions data from a category from categories 212. As a non-limiting example, pie chart 220 may display carbon emissions data of different types of fuel, such as gasoline, biodiesel, avgas, and the like, from a fuel-type category. Pie chart 220 may display, but is not limited to, comparison of categorized carbon emissions data from different categories from categories 212. Pie chart 220 may display, as a non-limiting example, sum of carbon emissions of direct emissions category and indirect emissions category. In another embodiment, the presentation content may include a map 224. Map 224 may include, without limitation, a local map, city map, and the like. Map 224 may include, without limitation, streets, addresses, traffic data, environmental data, tolls, times, and the like. In some embodiments, map 224 may display one or more transport routes. Map 224 may display a "best route", which as used in this disclosure, is an optimal route according to one or more transport criteria, such as without limitation minimization of any loss function as described in further detail below. As a non-limiting example, a best route may include a transportation path that has a minimal carbon emission. the presentation content may include one or more transportation criterion along a best route through map 224. Map 224 may display real-time streaming of transportation path. Map 224 may display real-time streaming of carbon emissions data along a transportation path. In some embodiment, the presentation content may include input window 228 for an operator to put data manually. An operator may put, but is not limited to, operation data into the input window 228. As a non-limiting example, an operator may put "airplane" into a transport vehicle type section in the input window 228. As another non-limiting example, an operator may put a name of the operator into an operator's name section in the input window 228. As another non-limiting example, an operator may put number of miles a transport vehicle traveled in a traveled miles section in the input window 228. An operator may select, but is not limited to, a category in which carbon emissions data to be categorized into a categories 212 section in the input window 228. As a non-limiting example, an operator may select a facility category in the input window 228 for carbon emissions data of electricity usage in a warehouse. As another non-limiting example, an operator may select a direct emissions category in the input window 228 for carbon emissions data of fuel combustion of a company-owned transporting truck.

Still referring to FIG. 2, in some embodiments, GUI 208 may use user input to display presentation content. A "user input," for the purposes of this disclosure, is input received by a user of a computing device. As a non-limiting example, a user may choose which categories to display by clicking title of categories in categories 212. As another non-limiting example, a user may choose what type of chart to display. As another example, a user may alter axis of a bar chart 216. The user input may include a manipulation of computer icons, such as, but not limited to, clicking, selecting, dragging and dropping, scrolling, and the like. The user input, as a non-limiting example, may be provided using a keyboard, mouse, microphone, or the like. In some embodiments, user input may include an entry of characters and/or symbols in a user input field. In some embodiments, user input may include touch input. One of ordinary skill in the art will appreciate the various ways a user may interact with graphical user interface. Examples of graphical user interface may be consistent with graphical user interface disclosed in U.S. patent application Ser. No. 17/749,669, filed on May 20, 2022, and entitled "APPARATUS FOR GENERATING A TRANSPORT REQUEST USING A GRAPHICAL USER INTERFACE," the entirety of which is incorporated by reference herein in its entirety.

Figure 3:
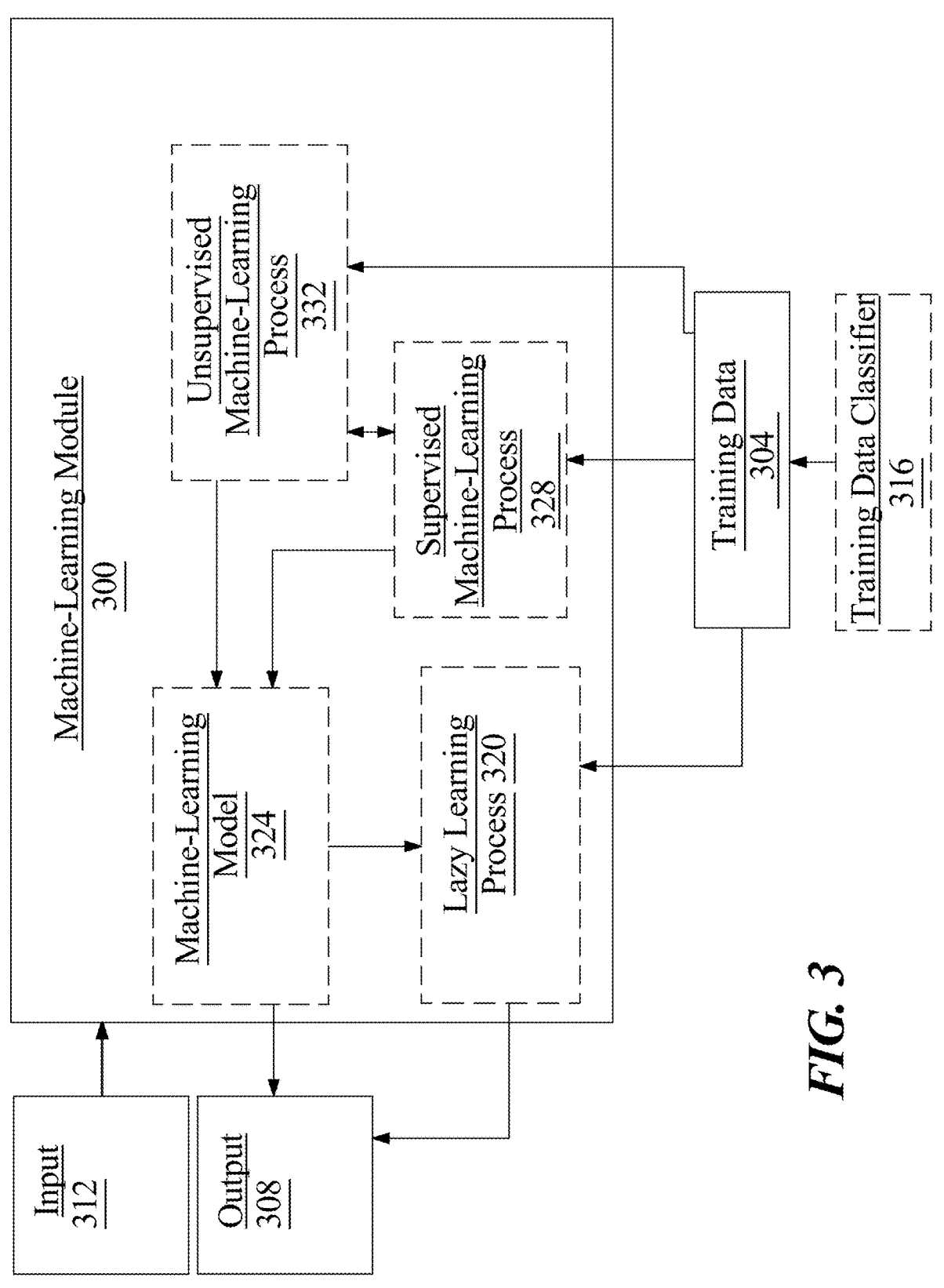
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and still referring to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, inputs may include carbon emissions data, correlated to a plurality of categories outputs.

Still referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to categorize carbon emissions data into a plurality of categories.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and still referring to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include carbon emissions data as described above as inputs, a plurality of categories as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Still referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Still referring to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 4:
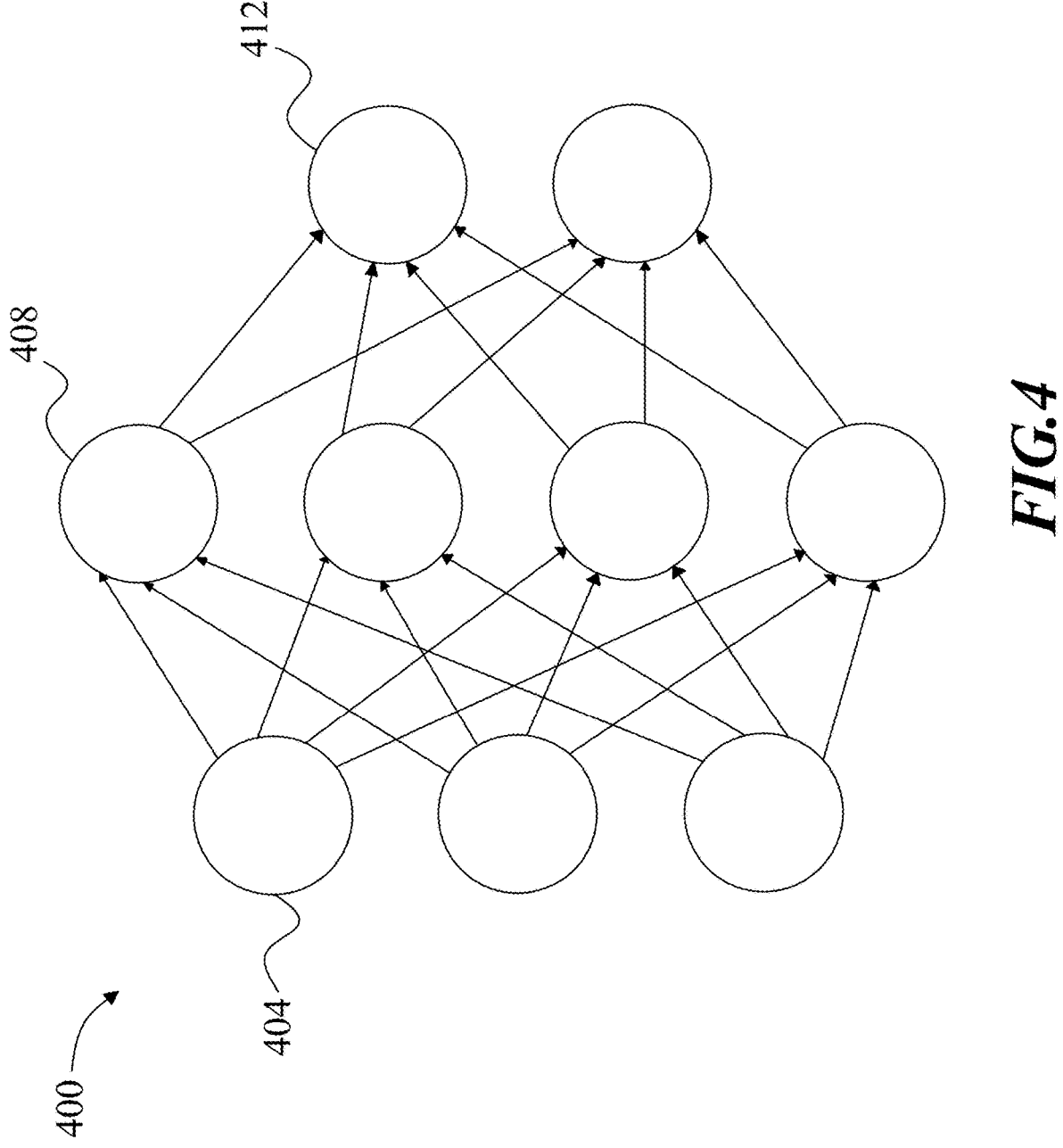
FIG. 4 is a diagram of an exemplary embodiment of neural network.

Referring now to FIG. 4, an exemplary embodiment of neural network 400 is illustrated. "Neural network" also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
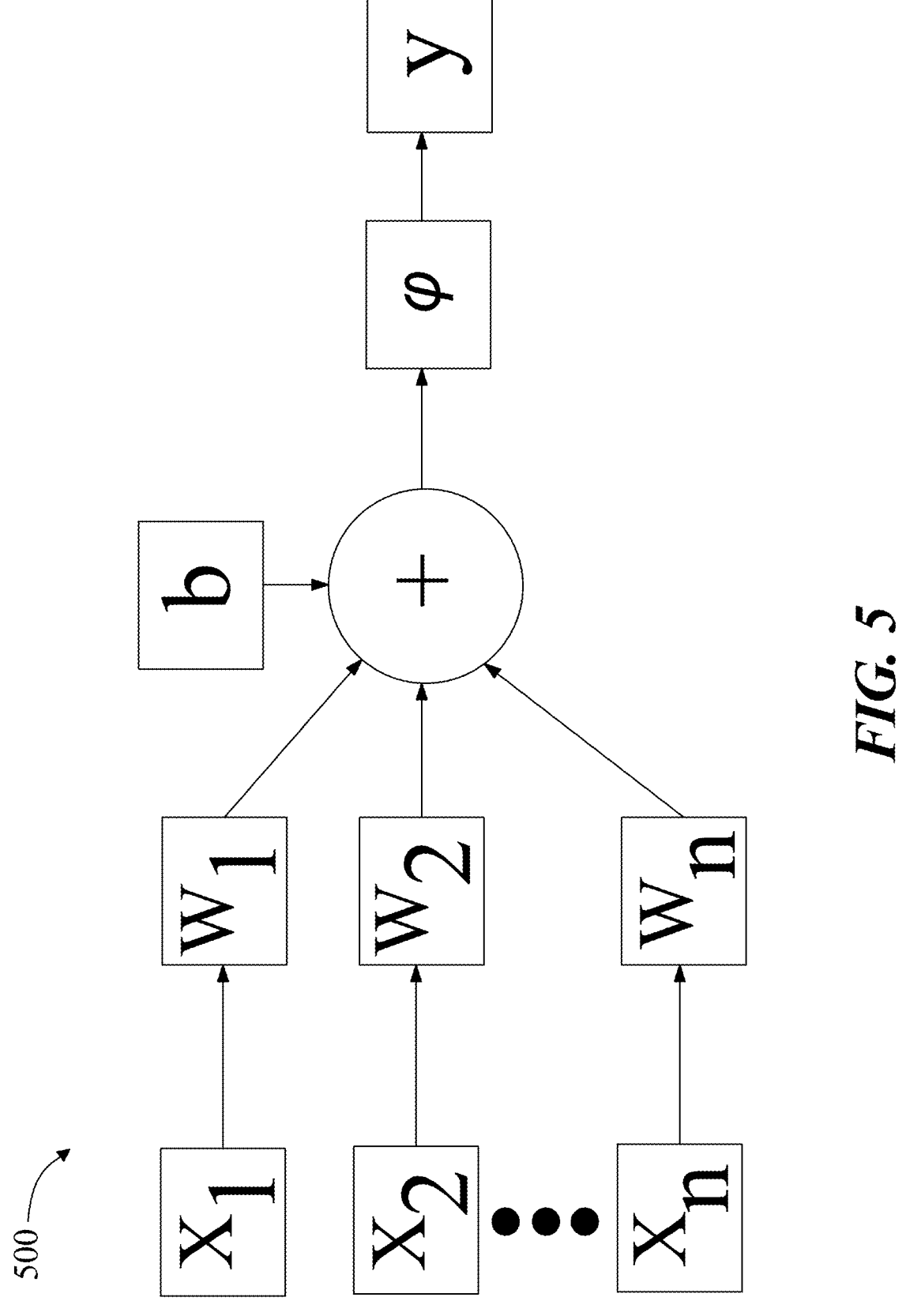
FIG. 5 is a diagram of an exemplary embodiment of a node of a neural network.

Referring now to FIG. 5, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
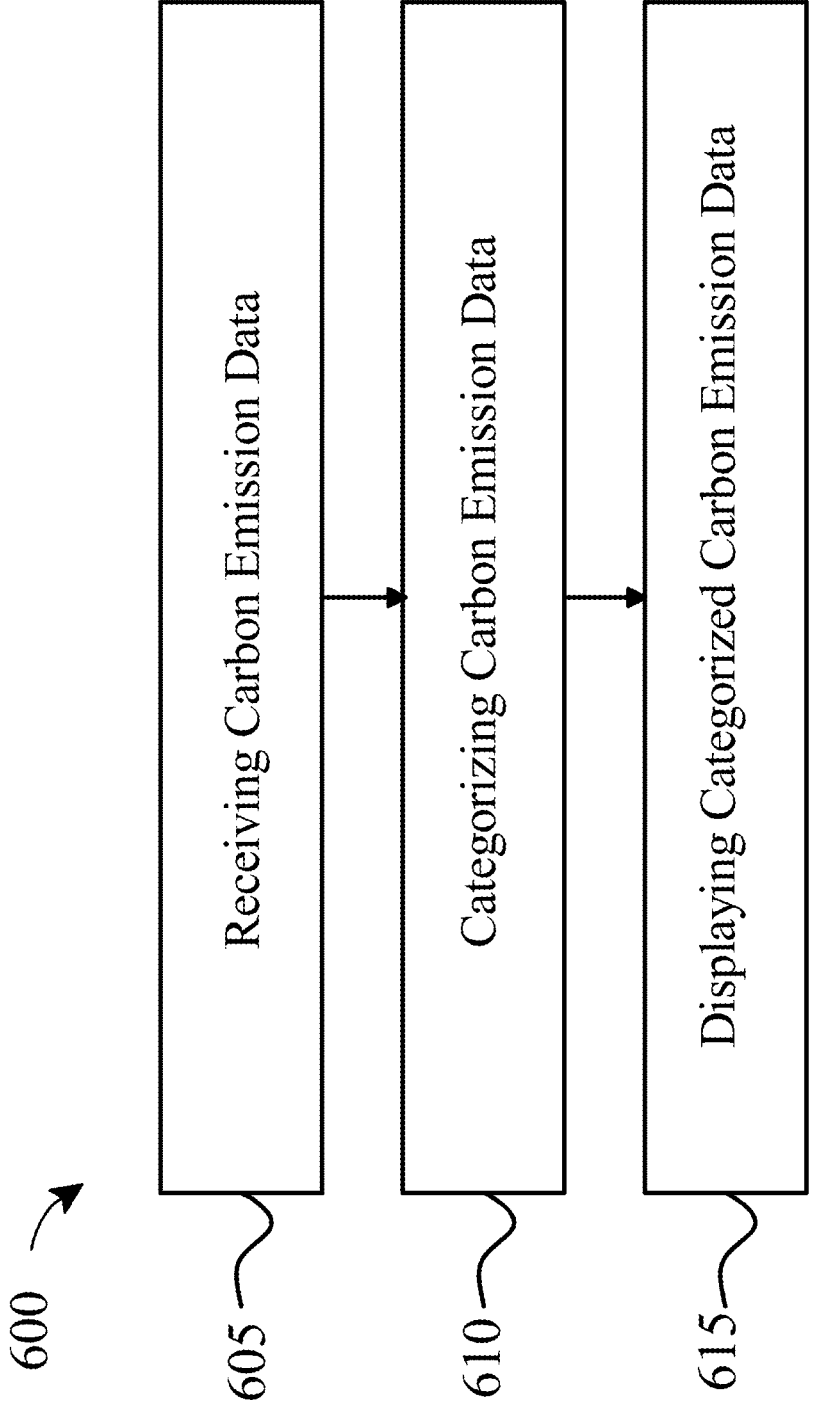
FIG. 6 is a flow diagram illustrating an exemplary method for displaying categorized carbon emissions.

Referring now to FIG. 6, an exemplary embodiment of method 600 is shown. Method 600 includes a step 605 of receiving carbon emissions data. Carbon emissions data may be calculated from operation data. Operation data may include transportation carbon footprint. This may be implemented as disclosed with reference to FIGS. 1-5.

Still referring to FIG. 6, method 600 includes a step 610 of categorizing the carbon emissions data into a category of a plurality of categories, wherein the plurality of categories comprises at least an indirect emissions category and at least a direct emissions category. The carbon emissions data may be categorized using a categorizing machine-learning model. The indirect emissions category comprises a category of the carbon emissions data from electricity usage in a facility. This may be implemented as disclosed with reference to FIGS. 1-5.

Still referring to FIG. 6, method 600 includes a step 615 of displaying presentation content comprising the categorized carbon emissions data, wherein the categorized carbon emissions data is displayed according to the at least an indirect emissions category and the at least a direct emissions category. An instruction may be received relating to the presentation content for the carbon emissions data. The instruction may be a default instruction. The instruction may be provided from an operator. The categorized carbon emissions data may be displayed on a mobile device using a network. This may be implemented as disclosed with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
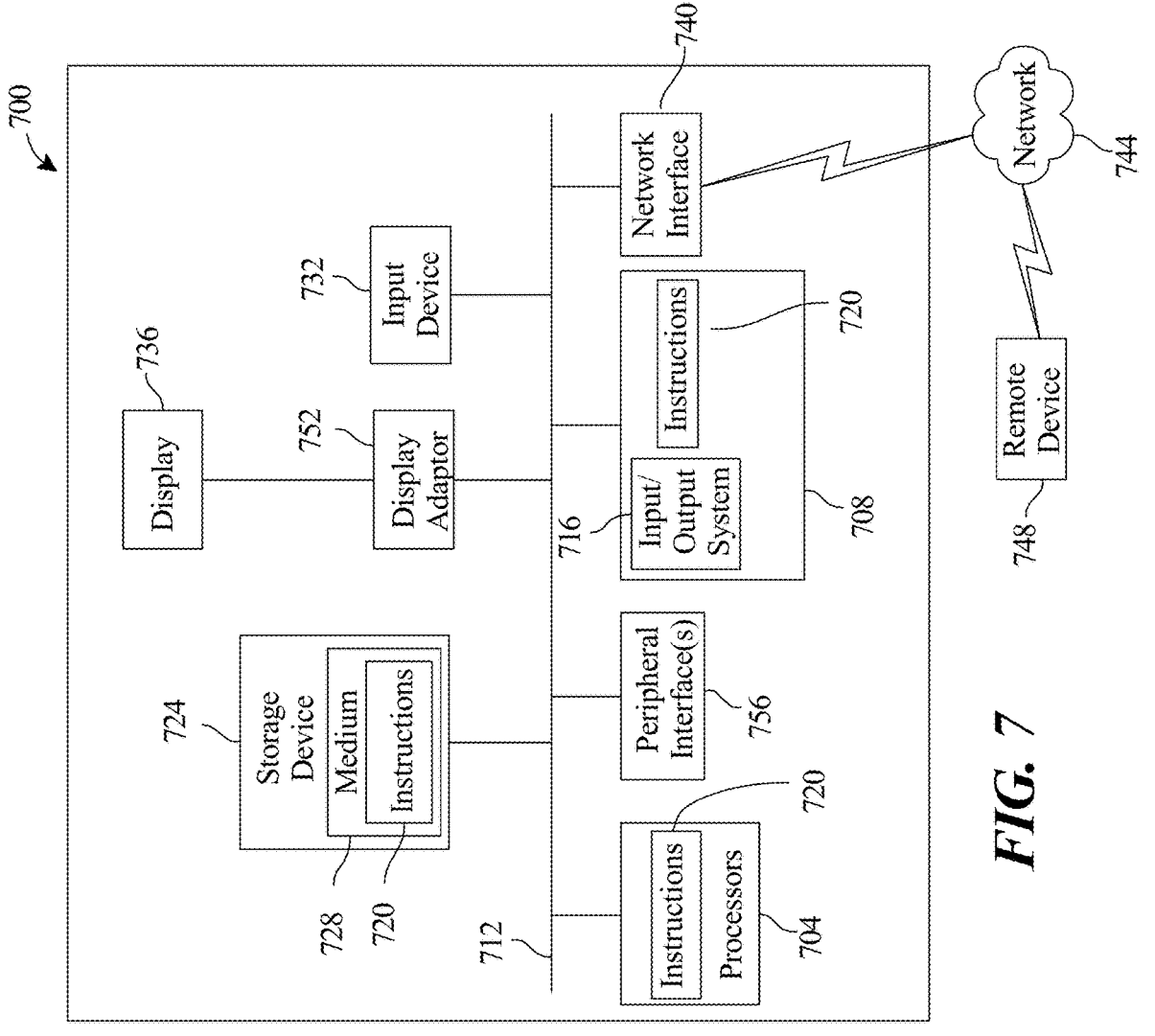
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for displaying categorized carbon emissions, the apparatus comprising:
   at least a processor; and
   a memory communicatively connected to the at least a processor, the memory containing instructions configuring the at least the processor to:
   detect operation data as a function of a plurality of sensors, wherein the plurality of sensors comprises at least an encoder configured to detect motion;
   calculate carbon emission data as a function of the operation data, wherein the operation data is stored in a database;
   generate a categorizing machine-learning model, wherein generating the categorizing machine-learning model comprises:
   receiving category training data, wherein the category training data comprises outputs correlated to inputs, wherein the inputs comprise a plurality of carbon emissions data correlated to outputs comprising a plurality of categories;

perform a lazy-learning process to simulate an initial heuristic comprising a ranking of the inputs and the correlated outputs; and
training, iteratively, the categorizing machine-learning model using the category training data and the initial heuristic comprising the ranking;
categorize the carbon emissions data into a category of the plurality of categories using the categorizing machine-learning model, wherein the plurality of categories comprises at least an indirect emissions category and at least a direct emissions category;
generate indirect emission training data, wherein the indirect emission training data comprises the indirect emissions data correlated to indirect emissions sub-categories, wherein the indirect emission sub-categories are selected as a function of the category of the plurality of categories generated using the categorizing machine-learning model;
train, iteratively, an indirect emission classifier as a function of the indirect emission training data;
classify the at least an indirect emission category generated using the categorizing machine-learning model into at least an indirect emissions sub-category as a function of the indirect emission classifier;
generate direct emission training data, wherein the direct emission training data comprises direct emissions data correlated to direct emissions sub-categories;
train, iteratively, a direct emission classifier as a function of the direct emission training data;
classify the at least a direct emission category generated using the categorizing machine-learning model into at least a direct emissions sub-category as a function of the direct emission classifier;
generate a best route as a function of the categorized carbon emissions data, wherein the best route comprises a transportation path with a minimal carbon footprint;
display presentation content, using a graphical user interface, wherein an instruction relating to the presentation content for the carbon emission data and a user input are received by a computing device and wherein the presentation content comprises:
   the best route;
   the categorized carbon emissions data, wherein the categorized carbon emissions data is displayed in real-time along the best route according to the at least an indirect emissions category and the at least a direct emissions category;
   the classified at least an indirect emissions sub-category; and
   the classified at least a direct emissions sub-category.

2. The apparatus of claim 1, wherein the carbon emissions data comprises a transportation carbon footprint.

3. The apparatus of claim 1, wherein the memory contains instructions configuring the at least a processor to calculate the carbon emissions data from operation data.

4. The apparatus of claim 3, wherein the operation data comprises transportation data.

5. The apparatus of claim 1, wherein the indirect emissions category comprises a category for carbon emissions from electricity usage in a facility.

6. The apparatus of claim 1, wherein the memory contains instructions configuring the at least a processor to receive an instruction relating to the presentation content for the carbon emissions data.

7. The apparatus of claim 6, wherein the instruction is a default instruction.

8. The apparatus of claim 6, wherein the instruction is provided from an operator.

9. The apparatus of claim 1, wherein displaying the presentation content comprising the categorized carbon emissions data comprises displaying the categorized carbon emissions data on a mobile device using a network.

10. A method for displaying categorized carbon emissions, wherein the method comprises:

detecting, by a plurality of sensors, operation data as a function of a plurality of sensors, wherein the plurality of sensors comprises at least an encoder configured to detect motion;

calculating, by at least a processor, carbon emission data as a function of the operation data, wherein the operation data is stored in a database;

generating, using the at least a processor a categorizing machine-learning model, wherein generating the categorizing machine-learning model comprises:

receiving category training data, wherein the category training data comprises outputs correlated to inputs, wherein the inputs comprise a plurality of carbon emissions data correlated to outputs comprising a plurality of categories;

performing a lazy-learning process to simulate an initial heuristic comprising a ranking of the inputs and the correlated outputs; and training, iteratively, the categorizing machine-learning model using the category training data and the initial heuristic comprising the ranking;

categorizing, using the at least a processor, the carbon emissions data into a category of a plurality of categories using the categorizing machine-learning model, wherein the plurality of categories comprises at least an indirect emissions category and at least a direct emissions category;

generating, by the at least a processor, indirect emission training data, wherein the indirect emission training data comprises the indirect emissions data correlated to indirect emissions sub-categories, wherein the indirect emission sub-categories are selected as a function of the category of the plurality of categories generated using the categorizing machine-learning model;

training, iteratively, by the at least a processor, an indirect emission classifier as a function of the indirect emission training data;

classifying, by the at least a processor, the at least an indirect emission category generated using the categorizing machine-learning model into at least an indirect emissions sub-category as a function of the indirect emission classifier;

generating, by the at least a processor, the at least a direct emission training data, wherein the direct emission training data comprises direct emissions data correlated to direct emissions sub-categories;

training, iteratively, by the at least a processor, a direct emission classifier as a function of the direct emission training data;

classifying, by the at least a processor, direct emission category generated using the categorizing machine learning model into at least a direct emissions sub-category as a function of the direct emission classifier; and generating, by the at least a processor, a best route as a function of the categorized carbon emissions data, wherein the best route comprises a transportation path with a minimal carbon footprint;

displaying presentation content using a graphical user interface, wherein an instruction relating to the presentation content for the carbon emission data and a user input are received by a computing device and wherein the presentation content comprises:

the best route;

the categorized carbon emissions data, wherein the categorized carbon emissions data is displayed in real-time along the best route according to the at least an indirect emissions category and the at least a direct emissions category;

the classified at least an indirect emissions sub-category; and the classified at least a direct emissions sub-category.

11. The method of claim 10, wherein the carbon emissions data comprises transportation carbon footprint.

12. The method of claim 10, calculating, using the at least a processor, the carbon emissions data from operation data.

13. The method of claim 12, wherein the operation data comprise transport data.

14. The method of claim 10, wherein the indirect emissions category comprises a category of the carbon emissions data from electricity usage in a facility.

15. The method of claim 10, further comprising:

receiving, using the at least a processor, an instruction relating to the presentation content for the carbon emissions data.

16. The method of claim 15, wherein the instruction is a default instruction.

17. The method of claim 15, wherein the instruction is provided from an operator.

18. The method of claim 10, wherein displaying presentation content comprises displaying the categorized carbon emissions data on a mobile device using a network.

* * * * *